UNITED STATES PATENT OFFICE.

WILHELM LOMMEL, OF ELBERFELD, GERMANY, ASSIGNOR TO FARBEN-FABRIKEN VORM. FRIEDR. BAYER & CO., OF ELBERFELD, GERMANY, A CORPORATION OF GERMANY.

LEUCO DERIVATIVE FROM GALLOCYANIN.

No. 856,536.   Specification of Letters Patent.   Patented June 11, 1907.

Application filed March 18, 1907. Serial No. 363,008.

*To all whom it may concern:*

Be it known that I, WILHELM LOMMEL, doctor of philosophy, chemist, a citizen of the German Empire, residing at Elberfeld, Germany, Kingdom of Prussia, have invented new and useful Improvements in a New Leuco Derivative from Gallocyanin, of which the following is a specification.

In United States Letters Patent 629,666, dated July 25, 1899 a process for producing leuco-gallocyanins is described, which process consists in treating the gallocyanin dyes with reducing agents.

I have now found that by varying the conditions a new leuco-derivative can be obtained which on oxidation yields a new dyestuff of the oxazin class, which I have described in another application for Letters Patent of same date, Ser. No. 363,009.

The new leuco-compound is produced by heating gallocyanin (obtained by the action of nitrosodimethylanilin on gallic acid) with alkaline reducing agents for a considerably longer time than is necessary for the formation of the known leuco-compound. It is advantageous to carry out the reaction in the presence of alkaline substances, such as sodium carbonate, caustic soda, or the like, which accelerate the reaction. The higher the temperature the sooner the reaction will be completed and the end of it can be easily determined. As soon as a test portion of the leuco-compound is after being oxidized insoluble in sodium carbonate solution and is soluble in hydrochloric acid of 20° Bé. with a pure blue color the reaction is finished. These tests readily distinguish the new leuco-compound from the known leuco-gallocyanin obtainable from gallocyanin (the product of the action of nitrosodimethylanilin on gallic acid). The latter reforms on oxidation the material from which it is produced namely gallocyanin which, as is known, is soluble in sodium carbonate solution and dissolves in hydrochloric acid of 20° Bé. with a red color. Furthermore the new leuco-compound is distinguished from the above mentioned leuco-gallocyanin by its increased solublity and when used in printing by producing much more easily the chrome-lake of the new dye.

The following example will serve to further illustrate my invention, the parts being by weight: 33,6 parts of the gallocyanin dye (obtained by the action of nitrosodimethyl-anilin on gallic acid) are suspended in 850 parts of water; a solution of 30 parts of crystallized sodium sulfid and 8 parts of caustic soda in 200 parts of water is added thereto and the mixture is heated for 1½ hours at 95° centigrade, care being taken to prevent the access of air as much as possible. The product of the reaction is tested from time to time as above described and the reaction is complete when on repeated testing it is found that after acidulation of a test portion with hydrochloric acid and filtration, neutralization of the filtrate with sodium carbonate and oxidation of the precipitated leuco-compound by air the dyestuff is insoluble in a sodium carbonate solution and soluble in hydrochloric acid of 20° Bé. with a pure blue color. When this point is reached the product of the reaction is acidulated with hydrochloric acid, the solution is filtered to remove the sulfur and the leuco-compound is precipitated from the filtrate by the addition of common salt. It is generally obtained as a dark resinous compound easily soluble in water.

The new leuco-compound can also be produced by heating the known leuco-compound of gallocyanin either in neutral or alkaline solution for some hours. When the reaction is finished hydrochloric acid is added and the new leuco-compound precipitated as above described.

The hydrochlorid of the new leuco-compound forms after drying and powdering a greenish-black powder easily soluble in water with a yellowish-green color soon turning blue in consequence of oxidation. It is almost insoluble in alcohol. On adding sodium acetate or sodium carbonate to the aqueous solution of the hydrochloric acid salt the free base separates out which oxidizes very rapidly on exposure to air. The new leuco-compound dissolves in concentrated sulfuric acid with a yellow color.

Having now described my invention and in what manner the same is to be performed, what I claim as new and desire to secure by Letters Patent is:—

The herein-described new leuco-compound of gallocyanin, obtainable by treating gallocyanin with alkaline reducing agents until a test portion of the product after oxidation is insoluble in sodium carbonate solution and dissolves in hydrochloric acid of 20° Bé. with a pure blue color, which new leuco-compound forms in the shape of its hydrochlorid, after drying and powdering, a greenish-black powder easily soluble in water with a yellowish-green color soon turning blue in consequence of oxidation; dissolving in concentrated sulfuric acid with a yellow color; the free base being separated by the addition of sodium carbonate to the aqueous solution of the hydrochlorid; substantially as hereinbefore described.

In testimony whereof I have hereunto set my hand in the presence of two subscribing witnesses.

WILHELM LOMMEL. [L. S.]

Witnesses:
OTTO KÖNIG,
J. A. RITTERSHAUS.